No. 740,409. PATENTED OCT. 6, 1903.
J. A. ERICKSON & F. W. YOUNG.
LUBRICATOR.
APPLICATION FILED FEB. 3, 1903.
NO MODEL.
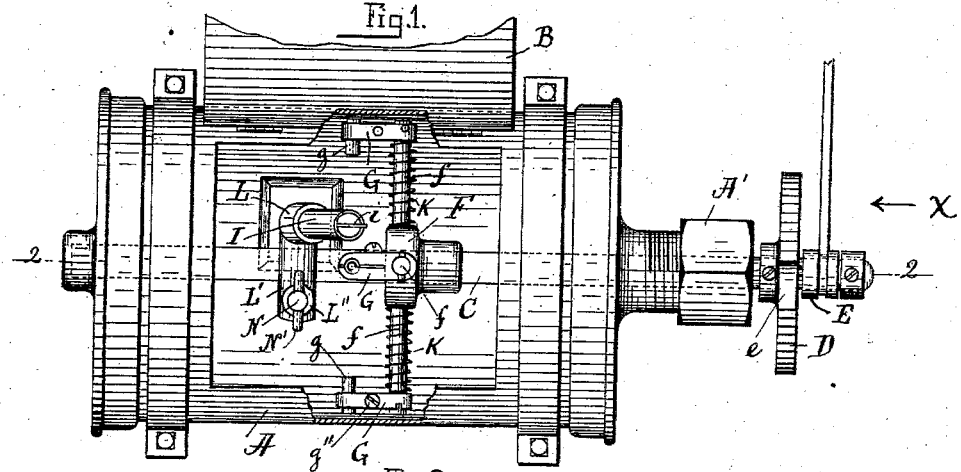
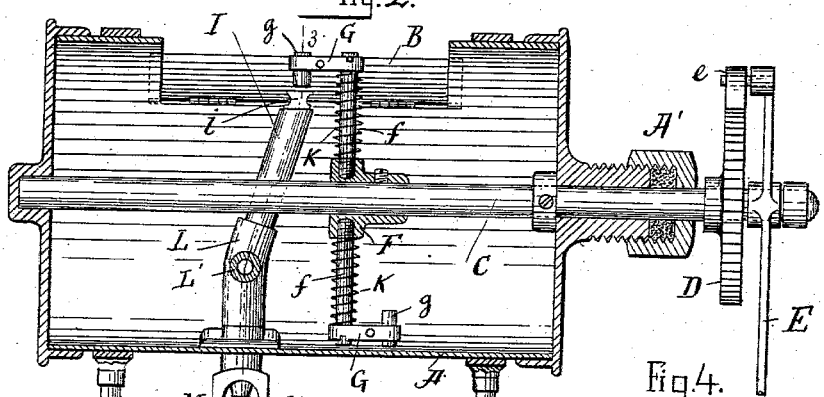
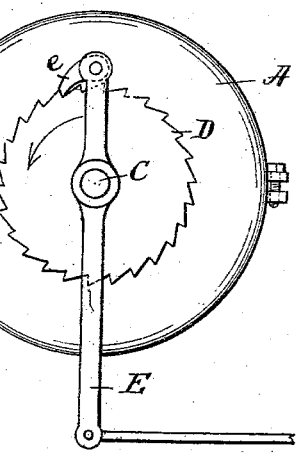
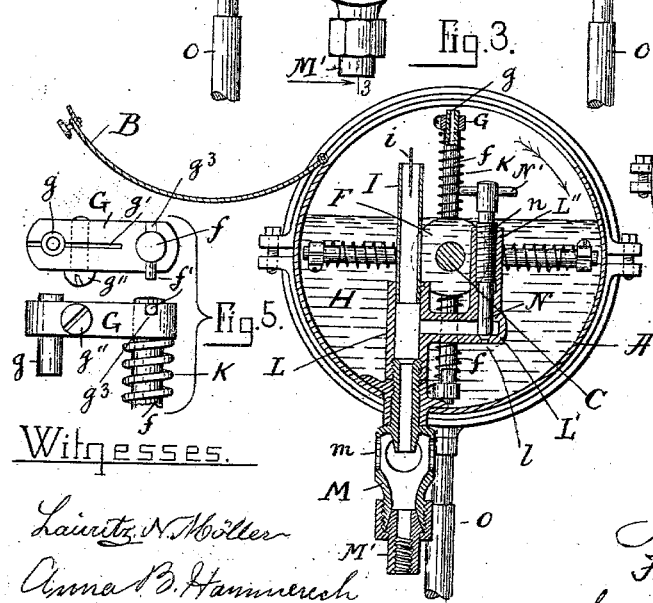
Witnesses.
Lauritz N. Möller
Anna B. Hammerich
Inventors.
John A. Erickson, and
Franz W. Young.
by Alban Andrew their atty.

No. 740,409. Patented October 6, 1903.

UNITED STATES PATENT OFFICE.

JOHN A. ERICKSON, OF MALDEN, AND FRANZ W. YOUNG, OF EVERETT, MASSACHUSETTS.

LUBRICATOR.

SPECIFICATION forming part of Letters Patent No. 740,409, dated October 6, 1903.

Application filed February 3, 1903. Serial No. 141,687. (No model.)

*To all whom it may concern:*

Be it known that we, JOHN A. ERICKSON, residing at Malden, and FRANZ W. YOUNG, residing at Everett, in the county of Middlesex and State of Massachusetts, citizens of the United States, have jointly invented certain new and useful Improvements in Lubricators, of which the following is a specification.

This invention relates to improvements on the patent for lubricators granted to John A. Erickson June 11, 1895, No. 540,966; and it consists in mechanism for readily regulating the amount of discharge of the lubricant from the receptacle in which it is contained, and it also relates, in combination with an automatic lubricator, to an auxiliary discharge device for the lubricant adapted for use in case the mechanism for actuating the automatic discharge device should by some reason become impaired or inoperative.

The invention is carried out as follows, reference being had to the accompanying drawings, wherein—

Figure 1 is a top plan view of the invention. Fig. 2 is a central longitudinal section on the line 2 2 shown in Fig. 1. Fig. 3 is a cross-section on the line 3 3 shown in Fig. 2. Fig. 4 is an end elevation seen from X in Fig. 1, and Fig. 5 is a detail top plan view and side elevation of one of the take-up tubes and carrier.

Similar letters refer to similar parts wherever they occur on the different parts of the drawings.

A represents the stationary oil-receptacle, provided with a hinged cover B in a manner like that shown and described in the above-mentioned patent. In bearings in the ends of the receptacle A is journaled the shaft or spindle C, one of said bearings being preferably provided with a stuffing-box A', as shown in the drawings, for the purpose of preventing leakages of the lubricant.

The shaft C is intermittently rotated, preferably by having attached to its outer end a ratchet-wheel D, actuated by a rock-lever E, hung on the shaft C and having pivotally connected to its upper end a pawl $e$, engaging the toothed periphery of the ratchet-wheel D. The lever E may be intermittently oscillated by connecting it to any desired reciprocating part of the engine, machine, or device that is to be lubricated.

To the shaft C, inside of the chamber A, is secured a wheel composed of a hub F, provided with radial arms $ff$, as shown. To the outer end of each of the arms $f$ is adjustably secured a take-up-tube carrier G, to which is secured in a suitable manner a take-up tube $g$, adapted to take up a portion of the lubricant H in the chamber A during the rotation of the said wheel and intermittently feed the lubricant into the discharge-pipe, as will hereinafter be more fully shown and described.

I is the discharge-pipe, one for each wheel $f$, leading from the upper interior portion of the chamber A to the bearing, slide, or other parts of the machine or engine that are to be lubricated. Within the upper end of the discharge-tube I is secured a wing or sweeper $i$, the upper end of which reaches nearly to the under side of the take-up tubes $gg$ as the latter pass freely by such wing or sweeper when at their highest position during their rotation, as shown in Fig. 2, and in a manner and for the purpose shown and described in the above-mentioned patent.

In practice we prefer to secure each take-up tube $g$ to its carrier G by slitting the latter, as shown at $g'$ in Fig. 5, and to clamp the tube $g$ in position on the said carrier by means of a binder-screw $g''$. (Shown in Fig. 5.) By this arrangement the position of the take-up may readily be adjusted so as to allow its inner end to pass freely by the wing or sweeper $i$ without coming in contact with it during the rotation of the radial arms $ff$.

It is desirable in a device of this kind to regulate the amount of feed of the lubricant to the discharge-tube I, and for such purpose the tube-carriers G G are adjustable on the arms $ff$—that is, they may be swung out of feeding position on the arms $f$, as represented in the lower portion of Fig. 2, and for such purpose a groove or recess $g^3$ is made on the outer face of each tube-carrier G, which is adapted to receive a transverse locking-pin $f'$, secured to the outer end of the arm $f$, and to be held so interlocked by means of a coiled spring K, surrounding each arm f between the hub F and the under side of the tube-carrier G, as shown in the drawings.

If it is desired to adjust the position of any one of the tubes g and its carrier G, all that is necessary to do is to push the latter downward on its arm f against the influence of the coiled spring K sufficiently to disengage the locking-pin f' from the notch on the tube-carrier, after which the latter may be turned half a revolution from the upper to the lower position, or vice versa, as represented in Fig. 2, and caused to be automatically held in such adjusted position by the locking device hereinabove described.

In practice the lower end of the discharge-tube I is secured or made integral with a tubular shell L, the lower end of which is firmly secured to a sight-feed box M, having drip-nozzle and lateral perforations m m below the bottom of the reservoir, through which the amount of feed may be seen at any time. To the lower end of such sight-feed is suitably secured the delivery-tube M', leading to the part of the machine, &c., that is to be lubricated. In connection with the aforesaid rotary or intermittently-rotary lubricating device it is desirable to provide means for directly feeding the lubricant from the receptacle A in case of accident to the mechanism by which the shaft C is actuated, and for such purpose we employ an auxiliary feed device, which is constructed as follows: We make on the shell L a tubular projection L', provided on its under side with a perforation l, normally covered by the lower end of a valve-stem N, as shown in Fig. 3. The upper end of the stem N is screw-threaded, as shown at n, and adjustable in a screw-threaded recess in a vertical extension L'', made integral with the tubular projection L'. The upper end of the valve-stem N is provided with a knob or handle N', by means of which it may be turned for the purpose of opening and closing the orifice l. By turning the stem N so that the conduit l is opened the lubricant will flow through such conduit and the tubular projection L' into the shell L and thence directly to the part of the machine to be lubricated.

To the receptacle A are secured in a suitable manner the posts or supports O O, the lower end of which may be rigidly secured to any stationary object in the vicinity in which the lubricator is located.

During the rotation of the wheel F f f the take-up tubes g g dip into the liquid lubricant and retain a portion thereof within them, and as each take-up tube reaches its upper position a drop of lubricant hangs below the lower end of the take-up tube, which drop as it passes by the sweeper i is taken up by the latter and deposited into the discharge-tube I in a manner shown and described in the above-mentioned patent.

If it is desired to reduce the feed of the lubricant, one or more of the tube-carriers G and their tubes g may be swung into the inoperative position shown in the lower portion of Fig. 2.

In case of any accident occurring to the mechanism for rotating the shaft C and its take-up devices it may be desirable to feed the lubricant direct from the receptacle A to the delivery-tube M', and this can be done simply by turning the valve-stem N more or less, by which the conduit l is opened to allow the lubricant to pass through it and the tubular part L' and out through the shell L and delivery-pipe M', as hereinabove set forth and described.

What we desire to secure by Letters Patent and claim is—

1. A lubricator, consisting of an oil-receptacle having a discharge-tube, provided with a wing or sweeper, mounted in its upper end, combined with a rotary hub arranged in said receptacle, radial arms on said hub, and a series of take-up tubes and carriers adjustably connected to said arms, and adapted to be held in operative or inoperative positions relative to the discharge-tubes, substantially as and for the purpose set forth.

2. A lubricator, consisting of an oil-receptacle having a discharge-tube, provided with a wing or sweeper mounted in its upper end, combined with a rotary hub arranged in said receptacle, radial arms on said hub, each such arm having journaled upon it a spring-pressed take-up-tube carrier adapted to be turned on said arm into operative or inoperative positions, and means substantially as described, for securing such tube-carrier in its adjusted positions, substantially as and for the purpose set forth.

In testimony whereof we have affixed our signatures in presence of two witnesses.

JOHN A. ERICKSON.
FRANZ W. YOUNG.

Witnesses:
ALBAN ANDRÉN,
LAURITZ N. MÉLLER.